(12) United States Patent
Spurgeon et al.

(10) Patent No.: US 11,465,369 B2
(45) Date of Patent: Oct. 11, 2022

(54) CLOSED LOOP HEAT STAKING DEVICE AND METHOD

(71) Applicant: Tooltex, Inc., Grove City, OH (US)

(72) Inventors: Alex Spurgeon, Lockbourne, OH (US); Ralph Brad Bivens, Orient, OH (US); Seth Capobianco, Orient, OH (US)

(73) Assignee: ToolTex, Inc., Grove City, OH (US)

( * ) Notice: Subject to any disclaimer, the term of this patent is extended or adjusted under 35 U.S.C. 154(b) by 0 days.

(21) Appl. No.: 16/687,814

(22) Filed: Nov. 19, 2019

(65) Prior Publication Data

US 2020/0156329 A1 May 21, 2020

Related U.S. Application Data

(60) Provisional application No. 62/769,044, filed on Nov. 19, 2018.

(51) Int. Cl.
*B29C 65/00* (2006.01)
*B29C 65/30* (2006.01)

(52) U.S. Cl.
CPC .......... *B29C 66/9231* (2013.01); *B29C 65/30* (2013.01); *B29C 66/9161* (2013.01)

(58) Field of Classification Search
CPC ... B29C 65/30; B29C 66/9161; B29C 66/919; B29C 66/9231; B29C 66/92311; B29C 66/92611; B29C 66/962
See application file for complete search history.

(56) References Cited

U.S. PATENT DOCUMENTS 6,099,291 A * 8/2000 Lanser ................ B29C 65/1487
425/508
2017/0129062 A1 * 5/2017 Caldwell ................ G05B 19/19

* cited by examiner

*Primary Examiner* — George R Koch
(74) *Attorney, Agent, or Firm* — Mueller Law, LLC; Jerry K. Mueller, Jr.

(57) ABSTRACT

A novel spring-loaded device utilizes a linear or rotary measuring sensor to measure distance and control heat using a PID loop or other type of control loop feedback program. The power of the heating element is controlled by a program, which takes distance from the target into consideration when determining output power. For example, if the target distance is 10 mm away the algorithm will apply 100% power until reaching 9 mm, at which point it will lower power to 90%. When the distance is 5 mm from the target, the power level will be 50%, and so on and so forth. The closed loop nature of the system will reduce power automatically using pulse width modulation (PWM) of the input power. This will allow modulation of the power to the heating element on the fly.

9 Claims, 6 Drawing Sheets

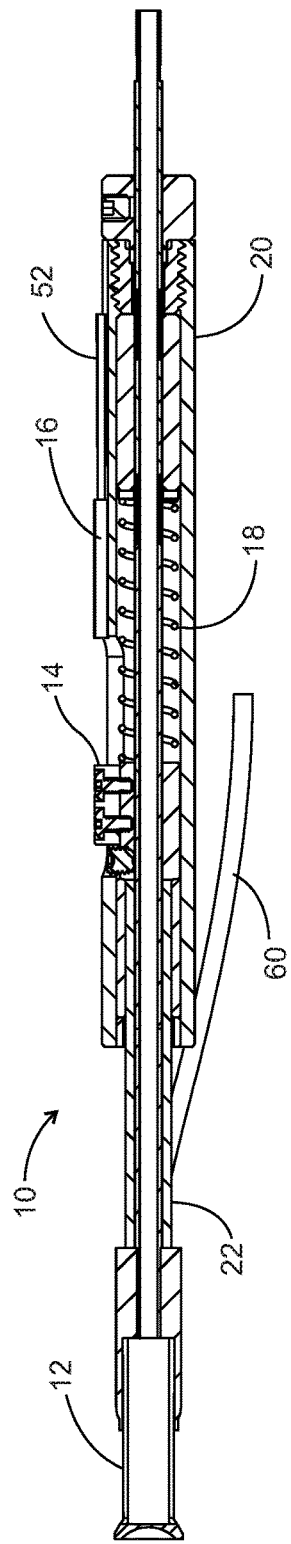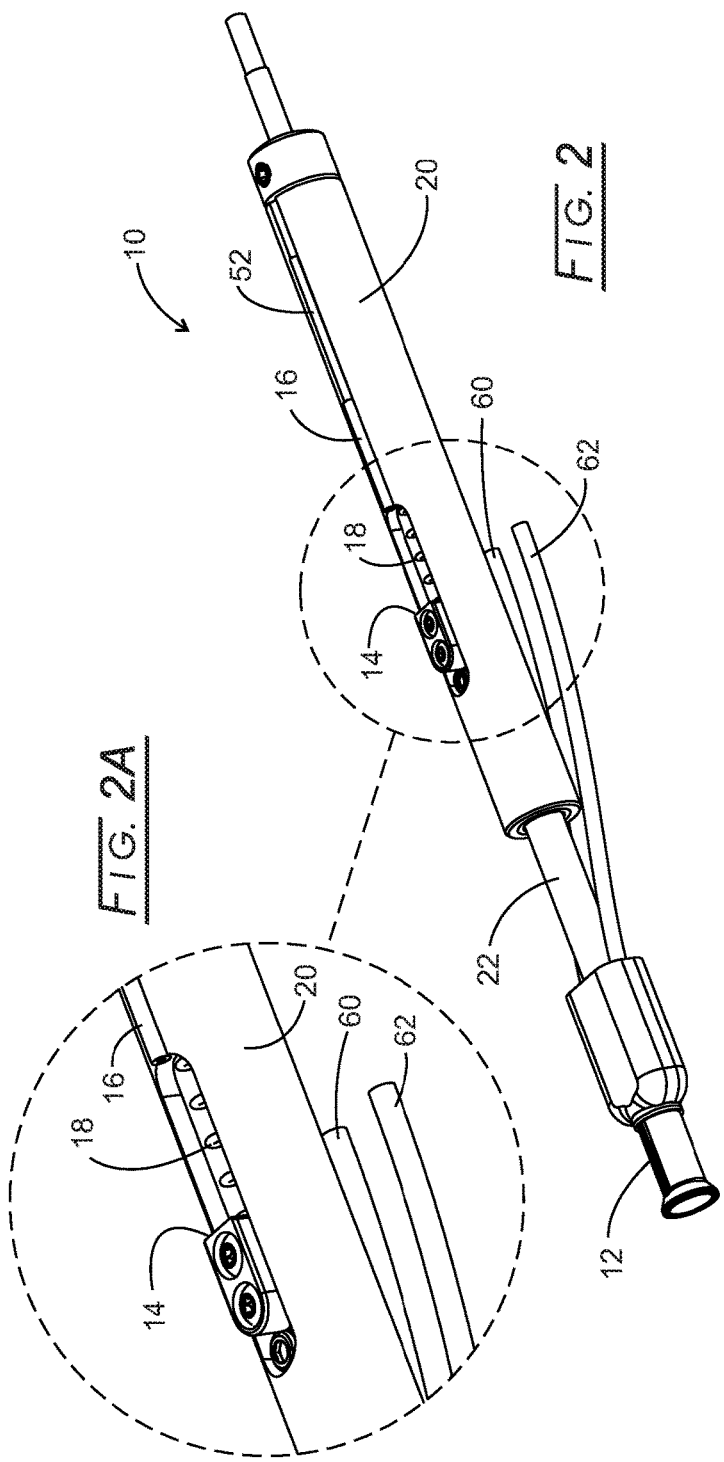

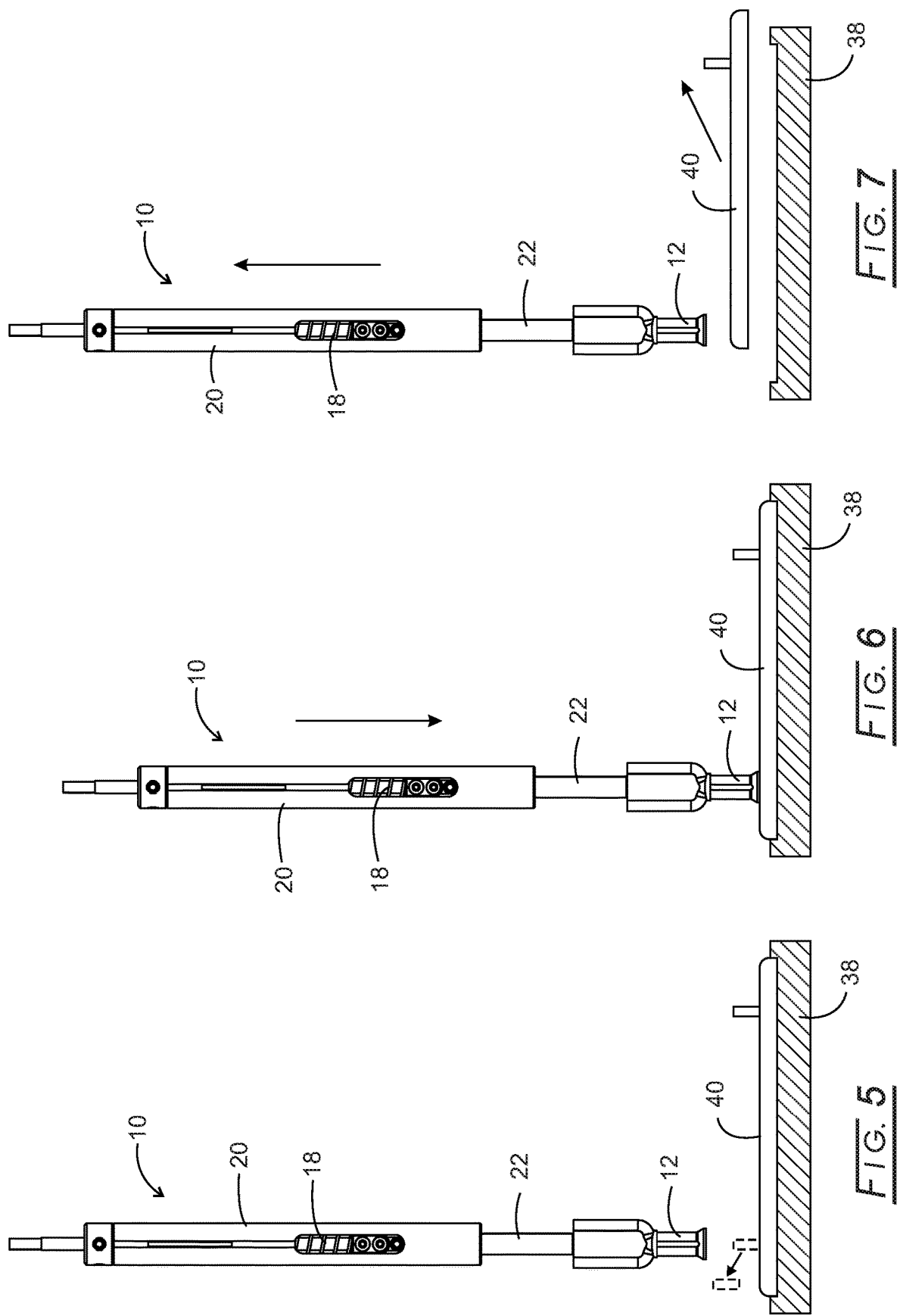

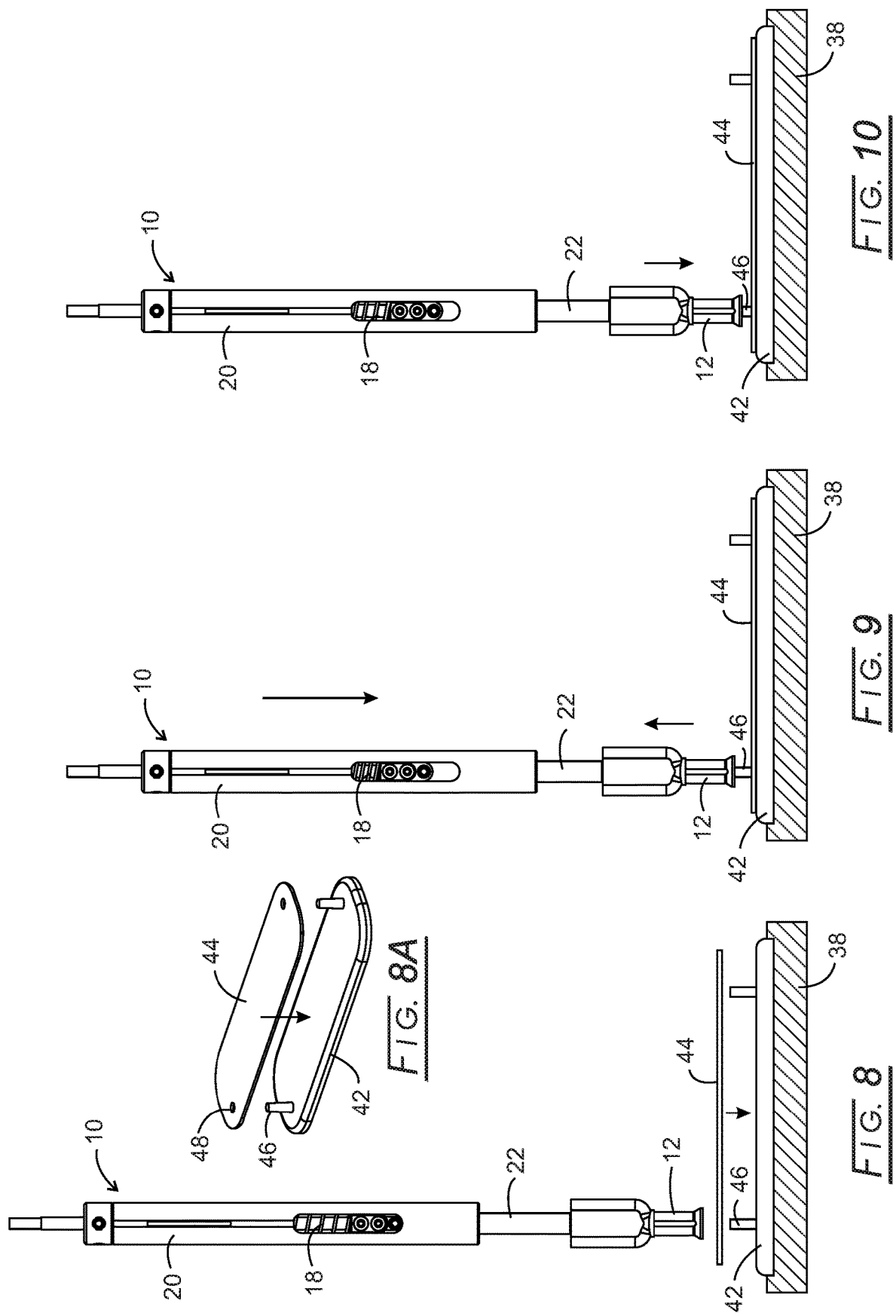

CLOSED LOOP HEAT STAKING DEVICE AND METHOD

CROSS-REFERENCE TO RELATED APPLICATIONS

This application claims benefit of U.S. Provisional 62/769,044 filed Nov. 19, 2018.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to a novel method of plastic heat staking and more particularly to a method by which a plastic boss is formed without manual inputs. The proposed method of staking incorporates a proportional-integral-derivative controller (PID) loop control with mechanical and digital mechanisms to successfully stake a boss with minimal human interaction.

The purpose of plastic heat staking is to bond one part to another part with a "boss" or other joining feature that is heated and formed into a dome shape that creates a mechanical bond. The unformed boss starts out as a post of any geometric shape upstanding from the sheet of another surface, such as a part, from which it is upstanding. In the present case, the boss is placed in a hole or other mating feature on a second part to which the boss-carrying part is to be attached or mated. This mating part can be made from a wide range of materials. Using heat from a probe, the boss is formed into a shape that is larger than the size of the opening through which it protrudes. The flattening or enlarging of the boss generates a mechanical bond whereby the two parts are inseparable unless excessive force is placed on the deformed (enlarged) boss.

Plastic heat staking or "heat forming" has been an assembly method for decades and can be done in a variety of methods including, for example, ultrasonic staking, hot air cold staking, hot probe heat staking, infrared staking, impulse staking, and the like. There are many staking methods and each method has its own advantages and disadvantages. What all staking methods share in common is the requirement of inputs that dictate the staking cycle.

All of these methods of staking require correct inputs to ensure an adequate, and more importantly, a repeatable forming or joining. All settings need to be correct in order to achieve a quality joining. All methods of staking have drawbacks, whether, for example, stringing, recovery, wear, capital cost, cost to operate, or settings difficulty. The impulse method of staking has eliminated many of the problems with all other methods, but a new issue has developed. Due to the multi-step heating approach of impulse staking, it often is difficult to train operators on proper setup and troubleshooting techniques. Part variances also can cause issues with joining consistency. Therefore, a need exists in the field of heat staking for a closed loop, input-free, method of staking.

BRIEF SUMMARY OF THE INVENTION

The present disclosure comprises a novel device that utilizes a linear or rotary measuring device to measure distance and control heat using a PID loop or other type of control loop feedback program. The linear or rotary measuring device can be optical, capacitive, magnetic, fiber optic, laser, or any other method of measurement that can be communicated to a digital or analog control system.

The power of the heating element is controlled by the program in a controller, which takes distance from the target into consideration when determining output power. For example, if the target distance is 10 mm, the algorithm will apply 100% power until reaching 9 mm, at which point it will lower power to 90%. When the distance is 5 mm from the target, the power level will be modulated to 50%, and so on and so forth. The closed loop nature of the system will reduce power automatically using pulse width modulation (PWM) of the input power. This will allow modulation of the power to the heating element on the fly. Alternatively, force could be measured rather than distance and power correlated to applied force.

The benefit of a closed loop system, as described herein, eliminates human error when inputting settings. The only requirement of the apparatus is to set the target distance; that is, to set the distance from the tip of the heat forming apparatus to the target boss. To setup the device, a user removes all bosses from a part to be formed and moves the tip of the device to the surface of the part sans boss in order to set a full displacement distance input for the system. Tips will engage the part where the boss has been removed and measuring sensor will report a "set" distance. This distance will be the target distance for the system during the forming process. Once the set distance is recorded, the system is able to move to the proper depth each time without any user input of settings.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 1 is a cross-sectional view of the disclosed boss heat forming device showing its component parts;

FIG. 2 is an isometric view of the disclosed heat forming device, including an enlarged view (FIG. 2A) of the target distance input and measurement sensor for such target distance;

FIG. 5 illustrates the step of removing a boss for the boss heat forming device travel distance to be determined;

FIG. 6 is an isometric view of the step of the boss heat forming device being lowered to contact the bossless part for the travel distance to be recorded;

FIG. 7 is an isometric view of the removal of the bossless part;

FIG. 8 is an isometric view of the two parts to be joined being placed in the fixture;

FIG. 8A is an isometric view of the two parts being joined;

FIG. 9 is an isometric view of the boss heat forming device contacting the boss during the heat forming process;

FIG. 10 is an isometric view of the boss being deformed due to it being softened by the applied heat;

Figure 3:
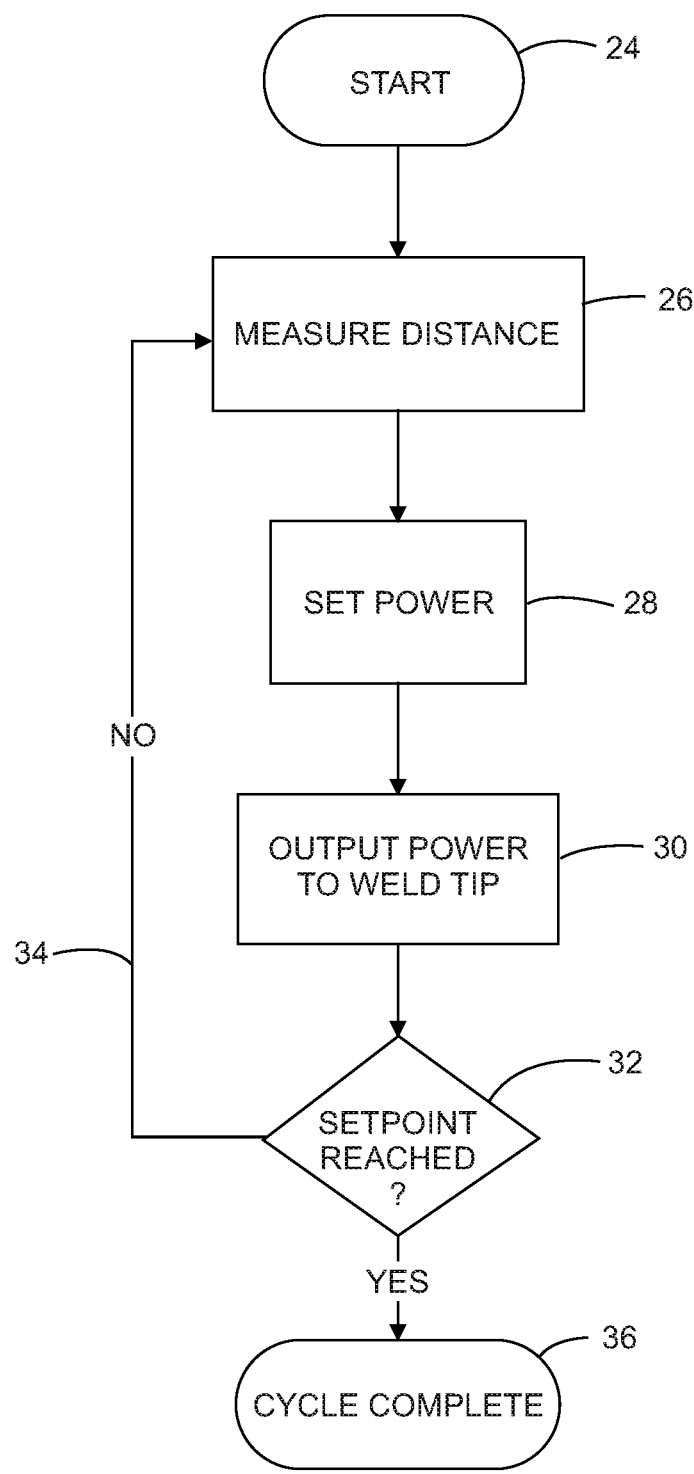
FIG. 3 is a flow chart describing the PID feedback (loop) control for using the disclosed boss heat forming device.

The drawings will be described in greater detail below.

DETAILED DESCRIPTION OF THE INVENTION

In the following detailed description, reference is made to the accompanying drawings, which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosure. The following detailed description, therefore, is not to be taken in a limiting sense, and the scope of the present disclosure is defined only by the appended claims, along with the full scope of equivalents to which such claims are entitled.

A disclosed heat forming device, 10, is shown in FIGS. 1 and 2. Referring initially to FIG. 1, the cross-sectional view of the disclosed apparatus includes a heatable heat forming tip, 12, a target distance input, 14, a measuring sensor, 16, and a force feedback member (e.g., spring, piston, actuator, or the like), 18, which applies a constant pressure against the boss through heatable heat forming tip 12 and maintains that pressure throughout the heat forming or staking cycle. Linear or rotary measuring sensor 16 can be optical, capacitive, magnetic, fiber optic, laser, or any other measurement sensor that can communicate to a digital or analog control system or program.

In a typical cycle, heatable heat forming tip 12 will be controlled by the distance reported by measuring sensor 16. Target distance input 14, measuring sensor 16, and spring member 18 are housed within an elongate hollow tube, 20. Heatable heat forming tip 12 is affixed to an elongate rod, 22, the extends into elongate hollow tube 20 and is connected to spring member 18 so as to be biased when heatable heat forming tip 12 pushes against a boss to be joined. Measuring sensor 16 measures the distance that heatable heat forming tip 12 is displaced or moved during the heat forming operation. Exemplary linear or rotary measuring sensors use, for example, optical, capacitive, magnetic, fiber optic, laser, or any other method of measurement that can be communicated to a digital or analog control system. A convenient length of boss heat forming device 10 will range from about, for example, 7 to 10 inches. Power is supplied to heat forming tip 12 by a pair of electrical leads, 60 and 62 (see FIG. 2), connected to a source of power, described below in connection with FIG. 11.

Figure 4:
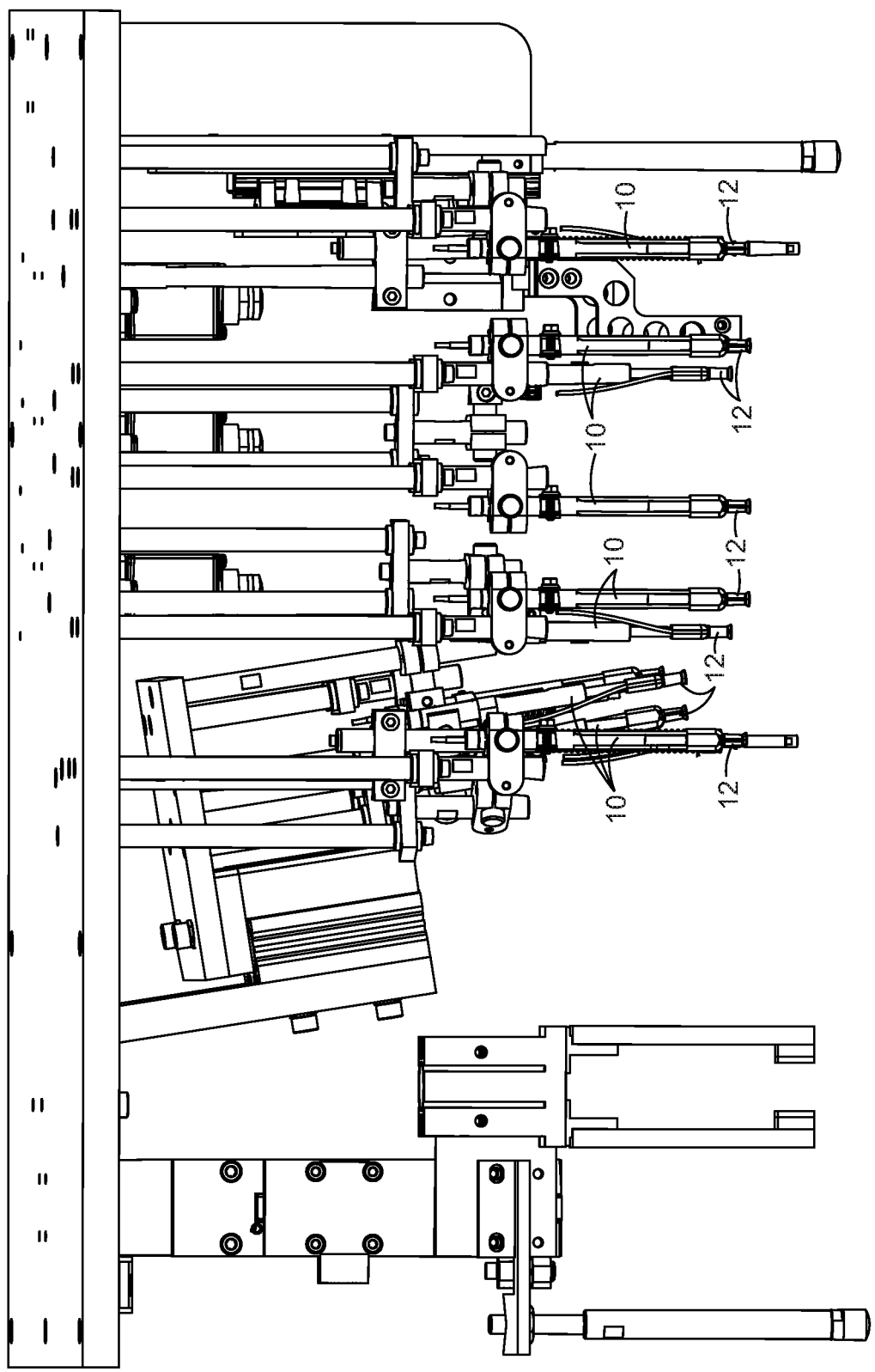
FIG. 4 is an array of the disclosed boss heat forming devices oriented in position to heat form multiple bosses simultaneously or serially.

FIG. 3 is a flow chart describing the PID feedback (loop) control of using the disclosed boss staking device. Heat forming tip 12 power is at 100% at the onset of the heat forming or staking process and proportionally decreases as the distance from the setpoint decreases. A simplified example of the loop is described below in connection with FIGS. 5-12. In particular, the staking process commences at start 24 and proceeds to step 26 whereat measuring sensor 16 (fiber optic, in this example) is poled and the distance of the tip to the setpoint distance is measured. FIGS. 4 and 5 illustrate such distance measurement process. A first sample part is placed in a fixture, 38. One of the bosses of sample part, 40, has been removed. Boss heat forming device 10 is lowered from a home position until tip 12 contacts the part where the boss was removed, as shown in FIG. 6. Measuring sensor 16 transmits the determined distance to target distance input 14. Boss heat forming device 10 is retracted upwardly and sample part 40 is removed from fixture 38, as illustrated in FIG. 7.

The process next proceeds to step 28 whereat the staking power is set by the control loop. A low voltage is passed through specially designed heatable heat forming tip 12 to generate heat at the boss/tip interface. Heatable heat forming tip 12 is designed to pass a low voltage current through a special geometry in order to heat only when in cycle. The tip remains cool to the touch while not in cycle, allowing for "heat on demand." The tip can be customized to the application and "tuned" to offer a highly efficient power use, since it is not maintaining a high temperature while not in use. In this regard, heatable heat forming tip 12 desirably is made from Kanthal® A-1 (Sandvik AB), which is a ferritic iron-chromium-aluminium alloy (FeCrAl alloy) for use at temperatures up to 1400° C. (2550° F.). The alloy is characterized by high resistivity and very good oxidation resistance. Alternatively, forming tip 12 could be made from a variety of stainless steels or alloys thereof, providing that such materials exhibited sufficiently high resistivity for the forming operation and oxidation resistance. The end of heatable heat forming tip 12 contains a cavity of any desirable design. A hemispherical cavity is illustrated in the drawings; although other geometrical designs may be used as is necessary, desirable, or convenient.

The two parts to be joined are shown in FIG. 8A and consist of a lower part, 42, having one or more upstanding bosses, as is illustrated by a boss, 46. The upper part, 44, has apertures or holes through which the lower part bosses fit in order to joint the two parts together. For disclosure purposes only, only boss 46 will be discussed; although, it will be recognized that multiple bosses requiring heat forming will be common. Those multiple bosses can be heat formed (or deformed) one at a time or simultaneously, as illustrated in FIG. 4 whereat an array of boss heat forming devices are seen. Note will be taken that some of the boss heat forming devices are non-vertically oriented for heat forming bosses on complex parts having non-horizontal surfaces with bosses that require heat forming to a second part.

Figure 11:
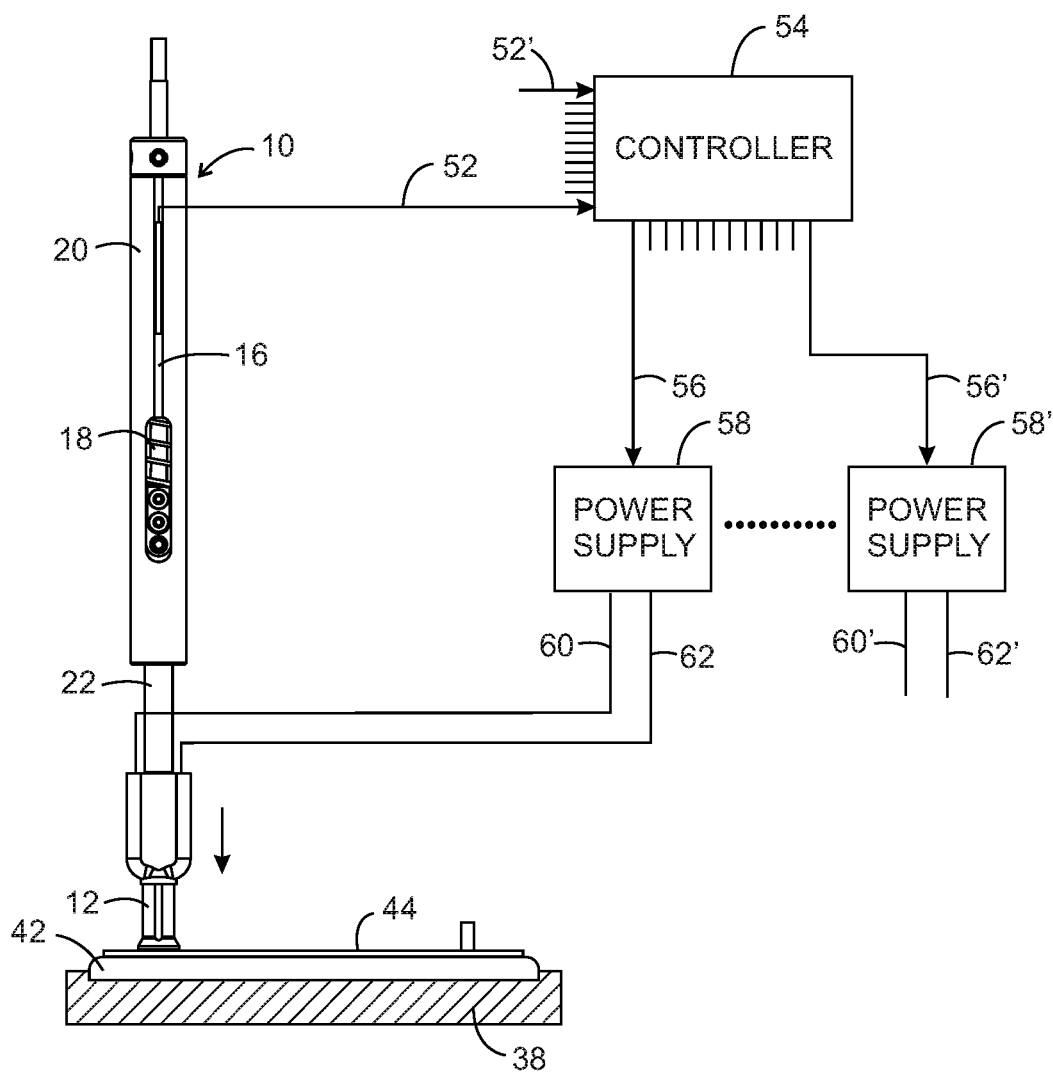
FIG. 11 is an isometric view of the last step where the boss has been flattened to a diameter greater than the hole in the upper part through which the boss was inserted.

The process continues to step 30 whereat the set power is applied to forming tip 12. In step 32, the measured distance is step 26 is compared to the setpoint distance. If the setpoint has not yet been reached, as is illustrated in FIGS. 9 and 10, the process returns via loop 34 to step 26. If the setpoint distance has been reached, as determined in step 32, the process proceeds to step 36 where at power is ceased and the staking loop is concluded, as is illustrated in FIG. 11. The amount of output power to heatable heat forming tip 12 can be determined, for example, by the following simple formula I:

$$\text{Output Power (\%)} = (\text{Start Distance} - \text{Setpoint Distance})/\text{Start Distance} \quad (I)$$

wherein:
(i) the Output Power is the power applied to the heating tip,
(ii) the Start Distance is the determined distance in step (a); and
(iii) the Setpoint Distance is the distance traveled by the heating tip.

This simple control loop allows the heat forming cycle to proceed on the feedback from measuring sensor 16. For example, if the distance is halfway between the start distance and the setpoint distance, the output power level will be 50%. This power decrement will continue as heat forming tip 12 nears the setpoint distance. This loop continues until the heat forming tip reaches the setpoint distance. The arrows adjacent boss heat forming device 10 in FIGS. 9 and 10 illustrate the force being exerted by spring 18 as the heat forming device is being lowered toward the part to be joined with corresponding force being exerted in the opposite direction by the parts (or their bosses). Formula I is based on the type of materials being heated being linear in nature. For materials that heat-deform non-linearly, a squared function may be needed to be added to Formula I, which is within the knowledge of a skilled heat staking artisan.

Referring again to FIG. 11, measuring sensor 16 inputs the position of boss heat forming device 10 to a controller, 54, by a fiber optic cable, 52. Position input data from other boss heat forming devices, such as the array shown in FIG. 4, also can be inputted to controller 54, such as illustrated by a fiber optic cable, 52'. Additional such input cables also would be inputter into controller 54 for the array.

Each boss heat forming device of the array has its own power supply for energizing each's heat forming tip. For boss heat forming device 10 in FIG. 11, controller 54 is in electrical connection to a power supply, 58, while another device of the array, as represented by the primed numbers, is supplied power from another power supply, 58', which is in connection with power supply 54 by a line, 56'. Electrical lines, 60 and 62, connect power supply 58 to heat forming tip 12. For the primed device, electrical lines, 60' and 62', connect power supply 58' to the primed boss heat forming device. In similar fashion, all of the heat forming devices of the array displayed in FIG. 4 would be in connection to controller 54 and to a separate power supply for each heat forming device. As will be apparent, controller 54 decrements the power supplied to heat forming tip 12 proportional to the distance of heat forming tip 12 to part 42, as described above, in accordance with formula I, above.

Figure 12:
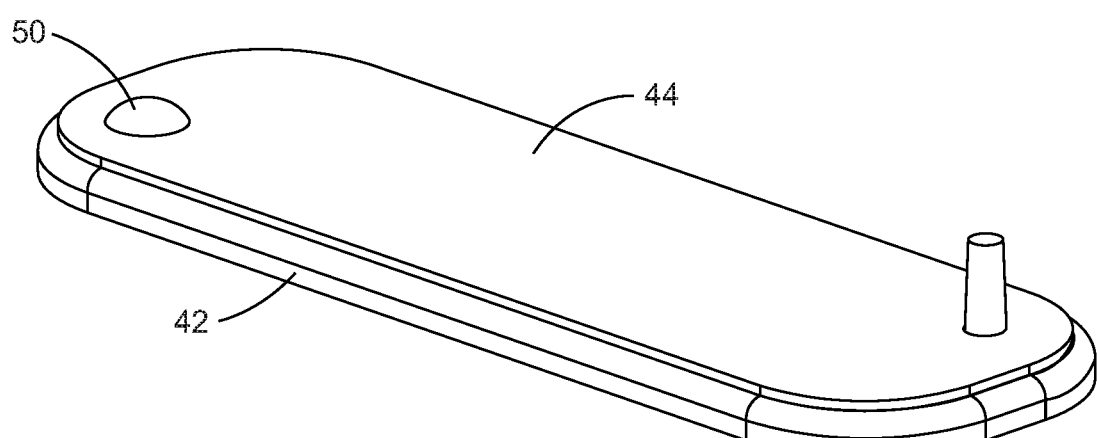
FIG. 12 is an isometric view of the joined parts.

The joined parts are shows in FIG. 12. Note that the portion of boss 46 extending above part 44 has been formed into the shape of the interior cavity in the end of heatable heat forming tip 12. Also, that dome shaped button, 50, extends beyond the diameter of hole 48 to join parts 42 and 44 together. Of course, other alignment features other than a hole could be used in the disclosed joining process.

Rather than using a measuring sensor and spring, a force transducer or strain gauge could be used to measure force applied by the tip against the boss and the force values fed into controller 54 and power applied to the tip being controller responsive to applied force. Of course, a different formula would be used rather than formula I, but that is within the skill of the artisan.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A method for plastic heat staking, which comprises the steps of:
   (a) determining a distance between a heating tip (12) of a boss heat forming device (10) in its home position and a surface of a part (42) containing a boss (46) to be heated;
   (b) placing the boss containing part in a fixture (38) with an upper part (44) containing an alignment feature (48) through which the boss penetrates and extends above the upper part;
   (c) heating the heating tip of the boss heat forming device tip at full power in the boss heat forming device home position;
   (d) moving the heating tip of the boss heat forming device towards the boss while a proportional-integral-derivative (PID) controller (54) decreases the power applied to the heating tip proportionally based on a distance between the heating tip and the surface of the boss containing part; and
   (e) ceasing applying power to the heating tip when the determined distance is reached by the heating tip.

2. The method of claim 1, wherein the heating tip of the boss heat forming device is spring (18) biased.

3. The method of claim 1, wherein the boss heat forming device additionally contains a target distance input (14) and a measuring sensor (16).

4. The method of claim 1, wherein the determined distance in step (a) comprises lowering the boss heat forming device from its home position to the surface of boss containing part with the boss removed.

5. The method of claim 1, wherein the PID controller controls an amount of output power to the heating tip of the boss heat forming device using the following formula:

$$\text{Output Power (\%)} = (\text{Start Distance} - \text{Setpoint Distance})/\text{Start Distance} \quad (I)$$

wherein:
(i) the Output Power is the power applied to the heating tip,
(ii) the Start Distance is the determined distance in step (a); and
(iii) the Setpoint Distance is the distance traveled by the heating tip.

6. The method of claim 1, wherein the tip of the boss heat forming device biased with a force transducer or strain gauge.

7. A boss heat forming device (10), which comprises:
   (a) an elongate hollow tube (20) bearing a target distance input (14), a measuring sensor (16), and a spring (18);

(b) an elongate rod (22) extending through the elongate tube to outside of the elongate tube;

(c) a heatable heat forming tip (12) affixed to an end of the elongate rod housed within the elongate tube, the heatable heat forming tip energizable for its heating; and (d) a proportional-integral-derivative (PID) controller (54) that accepts information from the target distance input and the measuring sensor, and is in electrical connection with the heatable heat forming tip for heating control, wherein the PID controller (54) is programmed to decrease power applied to the heatable heat forming tip proportionally based on a distance between the heating heatable heat forming tip and a boss of a boss containing part.

8. The boss heat forming device of claim 7, wherein the elongate rod is biased with a spring (18) located within the elongate hollow tube.

9. The boss heat forming device of claim 7, wherein the elongated rod is biased with a force transducer or strain gauge located within the elongate tube.

\* \* \* \* \*